United States Patent
Tingley

(10) Patent No.: US 6,934,626 B2
(45) Date of Patent: Aug. 23, 2005

(54) LOW-COST, LOW-POWER GEOLOCATION SYSTEM

(75) Inventor: Robert D. Tingley, Ashland, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 11 days.

(21) Appl. No.: 10/437,423

(22) Filed: May 13, 2003

(65) Prior Publication Data

US 2003/0229445 A1 Dec. 11, 2003

Related U.S. Application Data

(60) Provisional application No. 60/380,216, filed on May 13, 2002.

(51) Int. Cl.$^7$ .............................. G01C 21/20; G01S 3/02
(52) U.S. Cl. .................. 701/207; 701/214; 342/357.09; 342/357.14
(58) Field of Search ................................ 701/207, 213, 701/214, 215; 340/988, 992, 993; 342/357.01, 357.07, 357.08, 357.09, 357.12, 450, 453, 463, 357.14

(56) References Cited

U.S. PATENT DOCUMENTS

| | | | |
|---|---|---|---|
| 4,433,334 A | | 2/1984 | Caputi, Jr. .................. 343/450 |
| 4,667,202 A | | 5/1987 | Kammerlander et al. ... 342/457 |
| 4,888,593 A | | 12/1989 | Friedman et al. ........... 342/387 |
| 4,916,455 A | * | 4/1990 | Bent et al. .................. 342/457 |
| 4,975,710 A | | 12/1990 | Baghdady ................... 342/442 |
| 5,063,560 A | | 11/1991 | Yerbury et al. ............... 370/18 |
| 5,216,429 A | * | 6/1993 | Nakagawa et al. ............ 342/45 |
| 5,293,642 A | | 3/1994 | Lo ............................. 455/33.1 |
| 5,390,339 A | | 2/1995 | Bruckert et al. ........... 455/33.2 |
| 5,414,432 A | | 5/1995 | Penny, Jr. et al. .......... 342/357 |
| 5,592,180 A | * | 1/1997 | Yokev et al. ................ 342/450 |
| 5,608,411 A | | 3/1997 | Rose .......................... 342/417 |

(Continued)

OTHER PUBLICATIONS

E. Balboni et al, "An Empirical Study of Radio Propagation Abroad Naval Vessels," *Proceedings of Antennas and Propagation for Wireless Communications*, Nov. 6–8, 2000.

C. Drane et al, "Positioning GSM Telephones," *IEEE Communications Magazine*, Apr. 1998.

P. Krishnamurthy, "Analysis and Modeling of the Wideband Radio Channel for Indoor Geolocation Applications," *Ph.D. Dissertation*, Worcester Polytechnic Institute, Aug. 1999.

K. Pahlavan, P. Krishnamurthy and J. Beneat, "Wideband Radio Propagation Modeling for Indoor Geolocation Applications," *IEEE Communications Magazine*, Apr. 1998.

T. S. Rappaport et al, "Position Location Using Wireless Communications on Highways of the Future," *IEEE Communications Magazine*, Oct. 1996.

J. Werb and C. Lanzl, "Designing a Positioning System for Finding Things and People Indoors," *IEEE Spectrum*, pp. 71–78, Sep. 1998.

(Continued)

*Primary Examiner*—Tan Q. Nguyen
(74) *Attorney, Agent, or Firm*—Goodwin Procter LLP

(57) ABSTRACT

A system and method for determining the location of a transmission source by processing the magnitude of the transmitted signal received at a plurality of receivers with a statistical model of the signal propagation characteristics associated with the signal space between the source and each of the receivers. The system and method also are capable of determining a route of travel between the transmission source and a receiver and/or alternate location.

28 Claims, 4 Drawing Sheets

U.S. PATENT DOCUMENTS

| | | | | |
|---|---|---|---|---|
| 5,717,406 | A | * | 2/1998 | Sanderford et al. .......... 342/457 |
| 5,719,584 | A | | 2/1998 | Otto ........................... 342/465 |
| 5,724,047 | A | | 3/1998 | Lioio et al. .................. 342/442 |
| 5,974,039 | A | | 10/1999 | Schilling .................... 370/335 |
| 5,982,322 | A | | 11/1999 | Bickley et al. ............. 342/357 |
| 5,991,345 | A | * | 11/1999 | Ramasastry ................. 375/347 |
| 5,999,131 | A | | 12/1999 | Sullivan ...................... 342/465 |
| 6,054,950 | A | | 4/2000 | Fontana ....................... 342/463 |
| 6,061,022 | A | | 5/2000 | Menegozzi et al. .......... 342/442 |
| 6,094,168 | A | * | 7/2000 | Duffett-Smith et al. ...... 342/463 |
| 6,150,921 | A | | 11/2000 | Werb et al. ................. 340/10.1 |
| 6,163,297 | A | | 12/2000 | Rose .......................... 342/418 |
| 6,233,459 | B1 | | 5/2001 | Sullivan et al. ............. 455/456 |
| 6,236,365 | B1 | | 5/2001 | LeBlanc et al. ............. 342/457 |
| 6,243,648 | B1 | | 6/2001 | Kilfeather et al. .......... 701/213 |
| 6,255,992 | B1 | | 7/2001 | Madden ...................... 342/424 |
| 6,259,404 | B1 | | 7/2001 | Parl et al. ................... 342/457 |
| 6,263,208 | B1 | | 7/2001 | Chang et al. ............... 455/456 |
| 6,272,350 | B1 | | 8/2001 | Tekinay ...................... 455/506 |
| 6,285,318 | B1 | | 9/2001 | Schoen et al. ......... 342/357.16 |
| 6,292,665 | B1 | | 9/2001 | Hildebrand et al. ........ 455/456 |
| 6,300,903 | B1 | | 10/2001 | Richards et al. ............ 342/450 |
| 6,408,186 | B1 | | 6/2002 | Park et al. .................. 455/456 |
| 6,473,038 | B2 | | 10/2002 | Patwari et al. ............... 342/450 |
| 6,593,883 | B2 | * | 7/2003 | Johnson et al. ............. 342/387 |
| 6,611,232 | B1 | * | 8/2003 | Wunderlich et al. ........ 342/387 |
| 6,634,959 | B2 | * | 10/2003 | Kuesters ..................... 473/353 |
| 6,693,592 | B2 | * | 2/2004 | Dowdle et al. ............. 342/453 |

OTHER PUBLICATIONS

S. J. Howard and K. Pahlavan, "Measurement and Analysis of the Indoor Radio Channel in the Frequency Domain," *IEEE Transactions on Instrumentation and Measurement*, vol. 39, No. 5, pp. 751–755, Oct. 1990.

N. R. Yousef, L. M. A. Jalloul and A. L. Sayed, "Robust Time–Delay and Amplitude Estimation for CDMA Location Finding," *IEEE Proceedings of the Vehicular Technology Conference*, vol. 4, pp. 2163–2167, Delft, The Netherlands, Sep. 1999.

R. Tingley et al,"A Comparison of Two Techniques for Parameter Estimation of an Indoor Radio Channel," Proceedings of Wireless '99, Calgary, Alberta, Canada, (Jul. 12–14, 1999).

* cited by examiner

LOW-COST, LOW-POWER GEOLOCATION SYSTEM

REFERENCE OF RELATED APPLICATIONS

This application claims the benefit of U.S. Provisional Patent Application Ser. No. 60/380,216, filed on May 13, 2002, and entitled "Low-Cost, Low-Power Geolocation System," the entire contents of which are incorporated by reference herein.

GOVERNMENT SUPPORT

This invention was made with government support under Contract Number N00014-99-0033, awarded by Office of Naval Research. The Government may have certain rights in the invention.

FIELD OF THE INVENTION

The invention generally relates to positioning systems and methods. In particular, in one embodiment, the invention relates to an apparatus and techniques for determining the location of a transmission source based upon the strength of a signal measured by a plurality of receivers.

BACKGROUND OF THE INVENTION

Various methods for determining the location of transmission sources exist: self-positioning methods, time of arrival (TOA) methods, and angle of arrival (AOA) methods. In self-positioning methods, a unit has a transmission source and a receiver, such as a Global Positioning Satellite (GPS) receiver or Iridium receiver, capable of determining the location of the mobile unit based upon information received by the receiver from, for example, a Global Positioning satellite. This information may be periodically uplinked (transmitted) to a basestation, where it is stored in a database until needed.

TOA methods are subject to a cooperation protocol, where several basestations each estimate their range (i.e., distance) to a selected mobile unit. These estimated ranges are forwarded to a data fusion processor, which substitutes these estimated ranges into a navigation equation to solve for the position of the mobile unit. One disadvantage of existing TOA methods is that a stable time reference typically must be provided. In systems that employ GPS, the time reference is provided by a series of distributed atomic standards, which are each expensive (e.g., greater than about $1,000) and heavy (e.g., greater than about five pounds). In some systems, the mobile unit includes a sophisticated transponder to enable round trip flight time measurements. These transponders can be expensive, costing about $50 when purchased in large quantities, and are not very small, having a form factor about the size of a pocket calculator. Accuracy in TOA systems may degrade substantially in indoor and urban environments due to multipath propagation. Some of this degradation may be recovered using subspace or time-frequency processing, at the cost of a substantial computational penalty relative to conventional correlation processing.

In AOA systems, basestations deploy an active antenna array and employ multichannel signal processing. Because the carrier phase observed at each array element has a unique relationship to the bearing of the transmission source, the array element outputs may be processed together to provide an estimate of the source direction as measured by each array element. These estimated directions are forwarded to a fusion processor, which solves the geometry for the source location based upon the estimated directions. Some disadvantages of AOA systems are that the basestation typically must be equipped with a smart antenna, including multiple antenna elements, a multichannel data acquisition system, and the basestation must perform substantial signal processing. In order to maintain bearing accuracy, an AOA system must be regularly calibrated to compensate for drift in system components. Both the initial expenditure for each of the hardware and software components and the need for calibration limit the applicability of AOA to systems that can absorb the associated cost penalty. Also, as in TOA systems, the accuracy of AOA degrades rapidly in multipath environments.

A general deficiency in prior art systems is that they do not effectively determine the location of a transmission source without the use of large, relatively expensive transmitter and receiver hardware. Further, prior art systems do not effectively function in multipath environments.

SUMMARY OF THE INVENTION

The invention, overcomes the deficiencies of the prior art by, in one aspect, providing a method for determining the location of a transmission source, the method including the steps of receiving at a plurality of signal receiving locations at least one signal from a transmission source; determining a signal magnitude of each of the transmission signals received at the plurality of signal receiving locations; and processing each of the signal magnitudes with a statistical model of the signal propagation characteristics associated with the signal space between the transmission source and each of the receiving locations to determine the location of the transmission source.

According to one embodiment of the method, the step of processing includes processing information associated with a physical environment between the transmission source and each of the receiving locations. According to one feature of this embodiment, the step of processing includes determining a route of travel between the transmission source and at least one of the receiving locations. According to another feature, the step of processing includes determining a route of travel between the transmission source and an alternate location. According to another feature, the information associated with a physical environment are states (e.g., whether a door or hatch is open or closed) associated with elements of a route of travel between the transmission source and an alternate location.

According to another embodiment of the invention, the transmission source is mobile. In some embodiments the transmission source signal comprises a signal representative of a characteristic of the transmission source and/or of a person in contact with the transmission source. According to another embodiment, the statistical model of the signal propagation characteristics includes data representative of the manner in which the signal from the transmission source changes with respect to the distance of the signal from the transmission source. According to another embodiment, the step of processing includes performing an optimization procedure (e.g., averaging at least two position estimates or implementing a Kalman filter) to determine the location of the transmission source.

In general, in another aspect, the invention is directed to a system for determining the location of a transmission source. According to one embodiment, the system includes a transmission source capable of transmitting at least one signal, and a plurality of receivers, each capable of receiving the at least one transmitted signal. The system also includes a processor capable of determining signal magnitudes of the transmitted signals as received by each of the plurality of receivers and capable of processing each of the signal magnitudes with a statistical model of the signal propagation characteristics associated with the signal space between the transmission source and each of the receiving locations to determine the location of the transmission source.

In some embodiments, the processor is capable of processing information associated with a physical environment between the transmission source and each of the receiver locations. According to one feature of this embodiment, the processor determines a route of travel between the transmission source and at least one of the receivers or between the transmission source and an alternate location. According to another feature, the information associated with a physical environment includes state information (e.g., representing whether a door or hatch is open or closed) associated with elements of a route of travel between the transmission source and an alternate location.

In some embodiments, the transmission source is mobile. In other embodiments, the transmission signal includes a signal representative of a characteristic of the transmission source and/or of a person in contact with the transmission source. In another embodiment, the statistical model of the signal propagation characteristics includes data representative of the manner in which the at least one signal from the transmission source changes with respect to the distance of the at least one signal from the transmission source. In another embodiment the processor is capable of performing an optimization procedure (e.g., averaging at least two position estimates or implementing a Kalman filter) to determine the location of the transmission source.

In general, in another aspect, the invention is directed to a system for determining the location of a transmission source, wherein the system includes a log likelihood function having the formula:

$$\ln(p_{a/x,y}(a/x, y)) = \sum_{n=1}^{N} \ln\left(\frac{a_n \pi}{2P_n}[(x-x_n)^2 + (y-y_n)^2]^{\frac{g_n}{2}}\right) - \sum_{n=1}^{N} \left(\frac{a_n^2 \pi}{4P_n}[(x-x_n)^2 + (y-y_n)^2]^{\frac{g_n}{2}}\right);$$

where x is a location along an X-axis of a Cartesian coordinate system, y is a location along a Y-axis of a Cartesian coordinate system that is orthogonal to the X-axis, $x_n$ represents an X-axis location of an $n^{th}$ receiver in the Cartesian coordinate system, $y_n$ represents an Y-axis location of an $n^{th}$ receiver in the Cartesian coordinate system, $a_n$ is a measured signal strength at the location of the $n^{th}$ receiver, $g_n$ is a distance power gradient of the $n^{th}$ receiver relative to the transmitter, $P_n$ is a power received by the $n^{th}$ receiver at a location one meter from a transmitter and $p_{a/x,y}$ is a likelihood function.

BRIEF DESCRIPTION OF THE DRAWINGS

The foregoing and other objects, feature and advantages of the invention, as well as the invention itself, will be more fully understood from the following illustrative description, when read together with the accompanying drawings which are not necessarily to scale.

DETAILED DESCRIPTION OF ILLUSTRATIVE EMBODIMENTS

Figure 1:
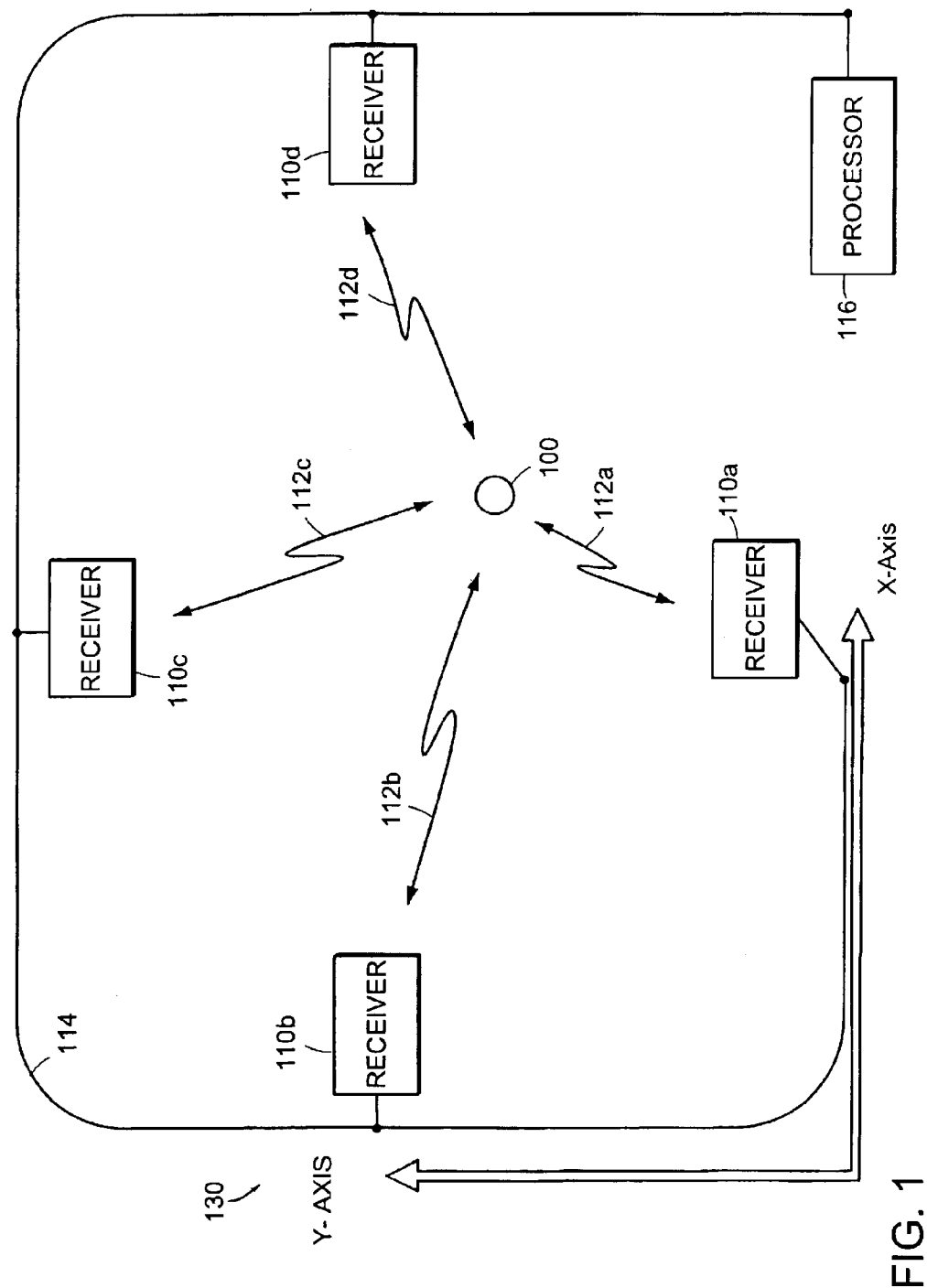
FIG. 1 is a schematic of a system for determining the location of a transmission source, according to an illustrative embodiment of the invention.

FIG. 1 is a schematic of a system 130 for determining the location of a transmission source 100. The system 130, in one embodiment, has a plurality of receivers 11a, 110b, 110c and 110d (generally 110) which are each capable of receiving a signal transmitted by the transmission source 100. The receivers 110 are each located at a predetermined or predefined location in, for example, an X-Y coordinate system. The location of each receiver 110 is stored in a processor 116. The processor 116 may, for example, be part of a computer system with a display whereby an operator may monitor the location of a person carrying the transmission source 100. The processor 116 may also provide an operator with information that describes a route of travel that can be taken by a person carrying the transmission source 100 while the person is moving.

The receivers 110a–110d each receive the signal transmitted by the transmission source 100 as represented by signals 112a–112d (generally 112), respectively. The signals 112 measured by each of the receivers 110 differ in their magnitude, generally, in proportion to the distance between each specific receiver 110 and the transmission source 110. The signal transmitted by the transmission source 100 may, for example, be a radio signal or some alternative signal that has a signal magnitude that varies proportionally with the distance between the receiver 110 and the transmission source 100.

According to the illustrative embodiment, each receiver 110 is connected to a communication cable 114. The communication cable 114 conveys or transmits the signals 112 to the processor 116. By way of example, the signals 112 may contain the magnitude of the signal measured by each of the receivers 110 as well as, for example, a unique code or signal for the transmission source 100 indicating the identity of a person in possession of the transmitting source 100. In another aspect, the processor 116 determines the magnitude of the signal measured by each of the receivers. The processor 116 determines the location of the transmission source 100 in an X-Y coordinate system by simultaneously processing the magnitude of each of the signals 112 with a statistical model of the signal propagation characteristics associated with the signal space between the transmission source 100 and each of the receivers 110.

Each receiver 110 may, alternatively, transfer or transmit the signals 112 received by each receiver 110 to the processor 116 via a wireless communication system or some other suitable alternative. In other embodiments of the invention, the transmission source 100 also includes a receiver and the system 130 transfers information from the processor 116 to each receiver 110 for subsequent transmission to the transmission source 100. By way of example, the information transmitted to a person holding the transmission source 100 may include directions instructing the operator to travel along a specific route. The directions may, for example, instruct the person as to what is the most direct route of travel from the current position of the person to one of the receivers 110, or alternatively, to an alternate location.

In one illustrative embodiment of the invention, the system, such as the system 130 of FIG. 1 may be adapted to determine the location of a transmission source in a coordinate system having additional dimensions. The invention in one aspect, is directed to a system, such as the system 130 of FIG. 1, and determines the location of the transmission source 100 in an X-Y-Z coordinate system by simultaneously processing the magnitude of each of the signals 112 with a statistical model of the signal propagation characteristics associated with the signal space between the transmission source 100 and each of the receivers.

The illustrative method of locating a transmission source includes the transmission of data or at least one signal by a transmission source, such as the transmission source 100 of FIG. 1, located at an arbitrary position {x,y}. This data is received and decoded by each of N access points (receivers 110) and forwarded, together with the accompanying signal strength of the transmission signal to a processor, such as the processor 116 of FIG. 1. The N measured signal strengths are collected as a vector:

$$a = [a_1\ a_2\ \ldots\ a_N], \quad (1)$$

which is defined as the observation vector. Elements constituting the observation vector are modeled as independent, identically distributed Rayleigh random variables, and the entire observation vector is characterized by the joint N-dimensional probability density function (pdf):

$$p_{a/b}(a/b) = \frac{a_1}{b_1^2} e^{-\frac{a_1^2}{2b_1^2}} \frac{a_2}{b_2^2} e^{-\frac{a_2^2}{2b_2^2}} \cdots \frac{a_N}{b_N^2} e^{-\frac{a_N^2}{2b_N^2}} = \prod_{n=1}^{N} \frac{a_n}{b_n^2} e^{-\frac{a_n^2}{2b_n^2}}, \quad (2)$$

where b is a vector composed of the expected value of each of the N measured signal strengths of vector a.

A probability density function g(y), for example, is a mathematical equation that identifies the probability of occurrence of each possible value of y. A Rayleigh probability density function (pdf), for example, is a pdf that is based on a Normal, or Gaussian, distribution (bell shaped curve) of a mathematical variable (e.g., y). Other types of pdf's that may be used include, for example, Ricean (which is also based on a Normal distribution) and Generalized-Gaussian, each of which has a different mathematical equation that describes the probability of occurrence of a given variable (e.g., y) value. Rayleigh and Ricean pdf's possess the envelope (shape) of a complex gaussian variate.

Equation (2) is also referred to as the likelihood function of the observation. Each of the N random variables, $a_n$, appearing in equation (2) is completely specified by its associated parameter $b_n$, which is related to the expected value of $a_n$:

$$b_n = \sqrt{\frac{2}{\pi}} E\{a_n\}, \quad (3)$$

where $E\{a_n\}$ represents the expected value (a mathematical operation) of $a_n$.

The signal strength of the signal received by a receiver is related to the distance between a receiver and the transmission source by:

$$E\{a_n\} = \sqrt{P_n}\,(d_n)^{-\frac{g_n}{2}}, \quad (4)$$

where $P_n$ represents the signal power received at 1 meter, $d_n$ is the distance from the transmission source to the n-th access point, and $g_n$ is the distance-power gradient. In an exemplary embodiment of the system, typical values of $P_n$ can range from about $10^{-3}$ to about $10^{-4}$ and $g_n$ can range from about 2 to about 3. The distance-power gradient is a number that represents the manner in which the, for example, power of a radio signal varies as a function of the distance the signal is measured from a transmission source. Values for the signal propagation characteristics associated with the signal space between the transmission source and each of the receivers (e.g., distance-power gradient and the 1-meter received power) are generally known a priori, as the result of a system calibration procedure (for example, the calibration procedure described later herein).

The exact location of each access point is recorded during the installation process and, therefore, the distance from the transmission source to each access point is computed as:

$$d_n = \sqrt{(x-x_n)^2 + (y-y_n)^2}, \quad (5)$$

where $\{x_n, y_n\}$ represents the location of the n-th access point. Substituting equations (4) and (5) into equation (3), the parameter of the n-th random variable is expressed as a function of location as:

$$b_n^2 = \frac{2P_n}{\pi}[(x-x_n)^2 + (y-y_n)^2]^{-\frac{g_n}{2}}. \quad (6)$$

Next, substituting equation (6) into equation (2) gives the likelihood function directly in terms of the spatial variables as:

$$p_{a/x,y}(a/x, y) = \prod_{n=1}^{N} \left( \frac{a_n \pi}{2P_n} [(x-x_n)^2 + (y-y_n)^2]^{\frac{g_n}{2}} \right) \quad (7)$$

$$e^{-\left( \frac{a_n^2 \pi}{4P_n} [(x-x_n)^2 + (y-y_n)^2]^{\frac{g_n}{2}} \right)}.$$

Equation (7) may be simplified by taking the natural logarithm of both sides, which yields:

$$\ln(p_{a/x,y}(a/x, y)) = \sum_{n=1}^{N} \ln\left( \frac{a_n \pi}{2P_n} [(x-x_n)^2 + (y-y_n)^2]^{\frac{g_n}{2}} \right) - \quad (8)$$

$$\sum_{n=1}^{N} \left( \frac{a_n^2 \pi}{4P_n} [(x-x_n)^2 + (y-y_n)^2]^{\frac{g_n}{2}} \right).$$

Subsequent selection of values for the parameters drives equation (7) to a maximum value. Because the logarithm is a monotonic function, the maximum of equation (8) must resides in the same location.

The best achievable estimator performance is bounded using the Fisher information matrix, which for the present case contains the terms:

$$F = \begin{bmatrix} E\left\{ \frac{\partial^2 \ln(p_{a/b}(a/b))}{\partial x^2} \right\} & E\left\{ \frac{\partial^2 \ln(p_{a/b}(a/b))}{\partial x \partial y} \right\} \\ E\left\{ \frac{\partial^2 \ln(p_{a/b}(a/b))}{\partial x \partial y} \right\} & E\left\{ \frac{\partial^2 \ln(p_{a/b}(a/b))}{\partial y^2} \right\} \end{bmatrix} \quad (9)$$

Once the Fisher matrix has been computed, the minimum possible variance is provided as the diagonal terms of $F^{-1}$.

Performing the partial differentiation of equation (8) gives the terms in the Fisher matrix as:

$$E\left\{ \frac{\partial^2 \ln(p_{a/b}(a/b))}{\partial x^2} \right\} = \sum_{n=1}^{N} \frac{g_n^2 (x-x_n)^2}{[(x-x_n)^2 + (y-y_n)^2]^2}, \quad (10a)$$

$$E\left\{ \frac{\partial^2 \ln(p_{a/b}(a/b))}{\partial y^2} \right\} = \sum_{n=1}^{N} \frac{g_n^2 (y-y_n)^2}{[(x-x_n)^2 + (y-y_n)^2]^2}, \quad (10b)$$

$$E\left\{ \frac{\partial^2 \ln(p_{a/b}(a/b))}{\partial x \partial y} \right\} = \sum_{n=1}^{N} \frac{g_n^2 (x-x_n)(y-y_n)}{[(x-x_n)^2 + (y-y_n)^2]^2}. \quad (10c)$$

Inserting the results of equations (10a, 10b and 10c) into equation (9) and performing the inversion gives the second moment of the error in identifying the x coordinate of the transmission source as:

$$E\{(\hat{x}-x)^2\} = \frac{\displaystyle\sum_{n=1}^{N} \frac{g_n^2(y-y_n)^2}{[(x-x_n)^2 + (y-y_n)^2]^2}}{\displaystyle\sum_{n=1}^{N}\sum_{m=1}^{N} \frac{(g_n^2 g_m^2 (y-y_n)^2 (x-x_m)^2)}{[(x-x_n)^2 + (y-y_n)^2]^2 [(x-x_m)^2 + (y-y_m)^2]^2} - \left[\displaystyle\sum_{n=1}^{N} \frac{g_n^2(x-x_n)(y-y_n)}{[(x-x_n)^2 + (y-y_n)^2]^2}\right]^2} \quad (11a)$$

and in the y coordinate as:

$$E\{(\hat{y}-y)^2\} = \frac{\displaystyle\sum_{n=1}^{N} \frac{g_n^2(x-x_n)^2}{[(x-x_n)^2 + (y-y_n)^2]^2}}{\displaystyle\sum_{n=1}^{N}\sum_{m=1}^{N} \frac{g_n^2 g_m^2 (y-y_n)^2 (x-x_m)^2}{[(x-x_n)^2 + (y-y_n)^2]^2 [(x-x_m)^2 + (y-y_m)^2]^2} - \left[\displaystyle\sum_{n=1}^{N} \frac{g_n^2(x-x_n)(y-y_n)}{[(x-x_n)^2 + (y-y_n)^2]^2}\right]^2} \quad (11b)$$

With an assumption that the transmission source is distant from all access points, the x and y error statistics are approximately independent. With this assumption, the standard deviation of the positioning error radius is given as:

$$\sigma_E \approx \sqrt{E\{(\hat{x}-x)^2\} + E\{(\hat{y}-y)^2\}} \quad (12)$$

where $\{\hat{x}, \hat{y}\}$ is representative of the position (or a close estimation thereof) of the transmission source.

Equation (12) provides an accurate characterization of the system error when there is a pre-defined coordinate system within which the receivers and the transmission source are located, the position of each receiver is know in the coordinate system, the values of the distance-power gradient and the one-meter power are pre-determined, and a channel transmission function (likelihood function of the observation) is predetermined in which the mean distribution follows a probability density function (e.g., a Rayleigh pdf).

By way of example, error prediction values ($\sigma_E$) for a transmission source located within a 15 m×15 m space for various quantities of receivers and for different distance-power gradient values are summarized in Table 1. The first entry (row) of the table, for example, represents a space with four access points (receivers); each located in the center of one of the sides of the 15 m×15 m space. The resulting error prediction is calculated to be 4.3 meters for a distance power gradient value of 2.

Table 1

Summary of Position Error

| Number Pas, N | Gradient, $g_n$ | $\sigma_E$, meters |
|---|---|---|
| 4 | 2 | 4.3 |
| 4 | 4 | 2.2 |
| 4 | 6 | 1.4 |
| 8 | 2 | 2.8 |
| 8 | 4 | 1.4 |
| 8 | 6 | 0.93 |

The standard deviation of the positioning error radius ($\sigma_E$) may be improved in numerous ways. By way of example, if the transmission source is stationary, multiple signal strength vectors (a) may be measured and transmitted to the processor, such as the processor 116 of FIG. 1. The processor then may take an average of the signal strength associated with each receiver (e.g., thereby removing electrical noise in the measurement) to improve the estimate of the location of the transmission source.

Further, an optimization procedure (for example, using a mathematical estimator, such as a Kalman filter subject to a target motion model) may be used to simultaneously process multiple signal strength vectors (a) with a statistical model of the signal propagation characteristics associated with the signal space between the transmission source and each of the receivers. Using, for example, the Kalman filter typically would allow for the system, such as the system 130, to simultaneously estimate a variety of motion parameters (e.g., location, velocity, and acceleration) associated with the transmission source. This procedure also could be used for calibration or calibration adjustment.

Location Algorithm

The illustrative method of locating a transmission source with a minimal possible deviation from the actual location of the transmission source involves using a vector of measured signal strengths of the following form:

$$a = [a_1 \ a_2 \ \ldots \ a_N], \qquad (13)$$

In which the signal strengths have been, for example, acquired in linear units (volts, volts/meter, etc.), and will provide an estimation of the position of the transmission source as:

$$\{x, y\} \Rightarrow \{\hat{x}, \hat{y}\}, \qquad (14)$$

where $\{\hat{x}, \hat{y}\}$ is representative of the position (or a close estimation thereof) of the transmission source. The log likelihood function:

$$\ln(p_{a/x,y}(a/x,y)) = \sum_{n=1}^{N} \ln\left(\frac{a_n \pi}{2P_n}[(x-x_n)^2 + (y-y_n)^2]^{\frac{g_n}{2}}\right) - \sum_{n=1}^{N} \left(\frac{a_n^2 \pi}{4P_n}[(x-x_n)^2 + (y-y_n)^2]^{\frac{g_n}{2}}\right), \qquad (15)$$

is then determined. The optimum coordinate estimates are those which satisfy the relationship:

$$\begin{bmatrix} \frac{\partial \ln(p_{a/x,y}(a/x,y))}{\partial x} \\ \frac{\partial \ln(p_{a/x,y}(a/x,y))}{\partial y} \end{bmatrix} = \begin{bmatrix} 0 \\ 0 \end{bmatrix}. \qquad (16)$$

From equation (15) the partial derivatives are given as:

$$\frac{\partial \ln(p_{a/x,y}(a/x,y))}{\partial x} = \sum_{n=1}^{N} \frac{g_n(x-x_n)}{(x-x_n)^2 + (y-y_n)^2} - \sum_{n=1}^{N} \left(\frac{a_n^2 \pi g_n (x-x_n)^2}{4P_n}[(x-x_n)^2 + (y-y_n)^2]^{\frac{g_n}{2}-1}\right), \qquad (17a)$$

$$\frac{\partial \ln(p_{a/x,y}(a/x,y))}{\partial y} = \sum_{n=1}^{N} \frac{g_n(y-y_n)}{(x-x_n)^2 + (y-y_n)^2} - \sum_{n=1}^{N} \left(\frac{a_n^2 \pi g_n (y-y_n)^2}{4P_n}[(x-x_n)^2 + (y-y_n)^2]^{\frac{g_n}{2}-1}\right). \qquad (17b)$$

One method used to estimate the position of the transmission source involves substituting the access point locations, distance power gradients, one-meter powers, and measured signal strengths, and solving for the roots of equations (17a and 17b). Solving these equations is facilitated by implementing a nonlinear numerical solver present in commercial software packages, such as MATLAB (offered for sale by The MathWorks, Inc. with offices in Natick, Mass.) or Mathematica (offered for sale by Wolfram Research, Inc. with offices in Champaign, Ill.).

By way of example, an implementation of the position estimation method using MATLAB resulted in a position estimate that converged to within seven significant digits within about 3 to about 4 iterations. An alternative approach which is typically computationally faster and may be implemented with many commercial software packages involves solving equations (17a and 17b) using a Newton-Raphson technique. This mathematical technique involves a recursive estimation of the position using the following iteration scheme:

$$\begin{bmatrix} \hat{x} \\ \hat{y} \end{bmatrix}_i = \begin{bmatrix} \hat{x} \\ \hat{y} \end{bmatrix}_{i-1} - \begin{bmatrix} \dfrac{\partial^2 \ln(p_{a/x,y}(a/\hat{x},\hat{y}))}{\partial \hat{x}^2} & \dfrac{\partial^2 \ln(p_{a/x,y}(a/\hat{x},\hat{y}))}{\partial \hat{x} \partial \hat{y}} \\ \dfrac{\partial^2 \ln(p_{a/x,y}(a/x,y))}{\partial \hat{y} \partial \hat{x}} & \dfrac{\partial^2 \ln(p_{a/x,y}(a/\hat{x},\hat{y}))}{\partial \hat{y}^2} \end{bmatrix}^{-1} \begin{bmatrix} \dfrac{\partial \ln(p_{a/x,y}(a/\hat{x},\hat{y}))}{\partial \hat{x}} \\ \dfrac{\partial \ln(p_{a/x,y}(a/\hat{x},\hat{y}))}{\partial \hat{y}} \end{bmatrix} \quad (18)$$

The elements of the 2×1 vector are directly found in equations (17a and 17b), while the elements of the 2×2 matrix are found by differentiation of equation (15):

$$\dfrac{\partial^2 \ln(p_{a/x,y}(a/x,y))}{\partial x^2} = \sum_{n=1}^{N} \dfrac{g_n[(y-y_n)^2 - (x-x_n)^2]}{[(x-x_n)^2 + (y-y_n)^2]^2} - \quad (19a)$$

$$\sum_{n=1}^{N} \dfrac{2\pi a_n^2 \left(\dfrac{g_n}{2} - 1\right) g_n (x-x_n)^2 [(x-x_n)^2 + (y-y_n)^2]^{\frac{g_n}{2}-2} + \pi a_n^2 g_n [(x-x_n)^2 + (y-y_n)^2]^{\frac{g_n}{2}-1}}{4P_n}$$

$$\dfrac{\partial^2 \ln(p_{a/x,y}(a/x,y))}{\partial y^2} = \sum_{n=1}^{N} \dfrac{g_n[(x-x_n)^2 - (y-y_n)^2]}{[(x-x_n)^2 + (y-y_n)^2]^2} - \quad (19b)$$

$$\sum_{n=1}^{N} \dfrac{2\pi a_n^2 \left(\dfrac{g_n}{2} - 1\right) g_n (y-y_n)^2 [(x-x_n)^2 + (y-y_n)^2]^{\frac{g_n}{2}-2} + \pi a_n^2 g_n [(x-x_n)^2 + (y-y_n)^2]^{\frac{g_n}{2}-1}}{4P_n}$$

$$\dfrac{\partial^2 \ln(p_{a/x,y}(a/x,y))}{\partial x \partial y} = \quad (19c)$$

$$\sum_{n=1}^{N} \dfrac{\pi a_n^2 \left(\dfrac{g_n}{2} - 1\right) g_n (x-x_n)(y-y_n)[(x-x_n)^2 + (y-y_n)^2]^{\frac{g_n}{2}-2}}{2P_n} - 2\sum_{n=1}^{N} \dfrac{g_n(x-x_n)(y-y_n)}{[(x-x_n)^2 + (y-y_n)^2]^2}$$

Figure 2:
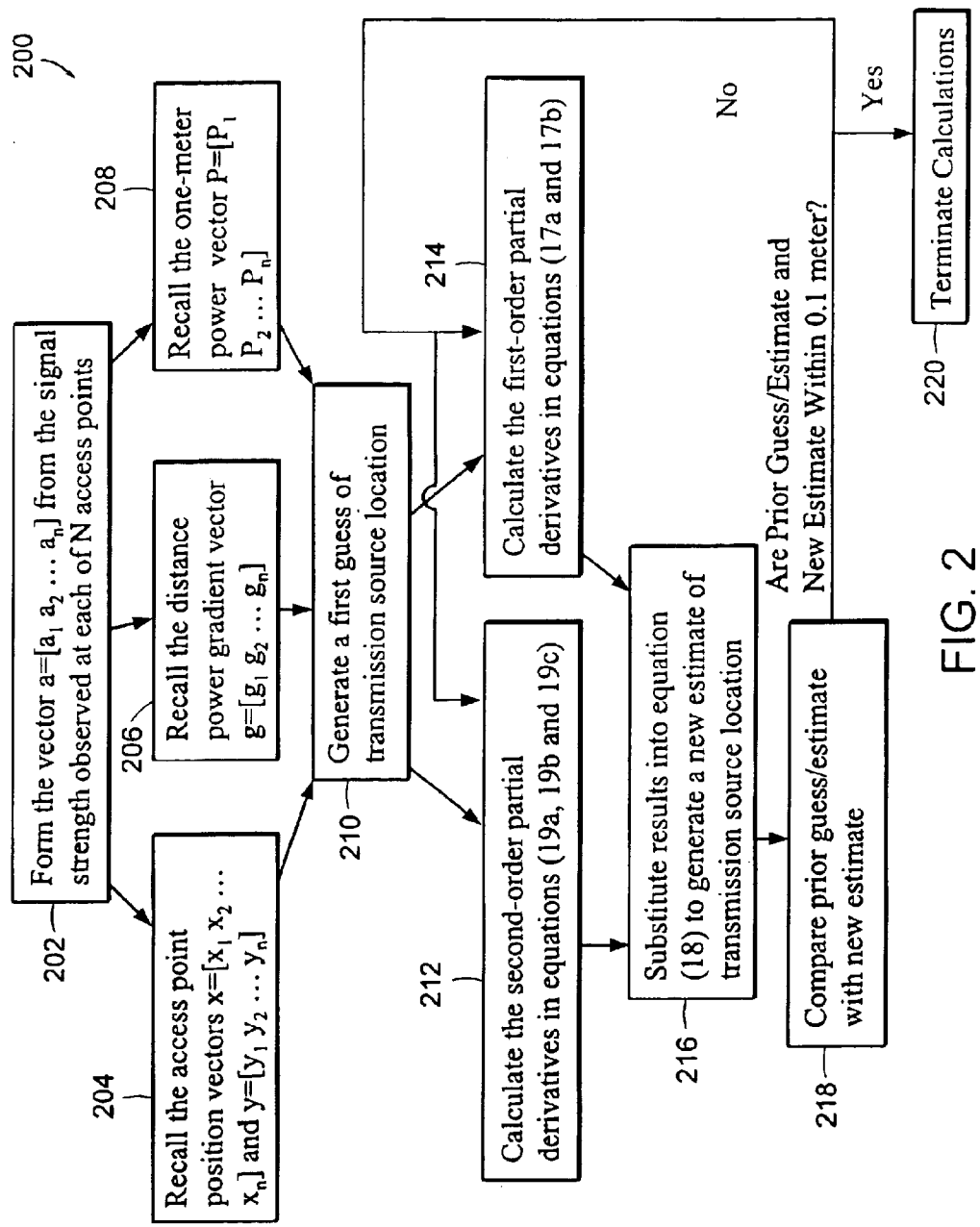
FIG. 2 is a flowchart depicting a computer implementation of an illustrative embodiment of the method according to the invention.

The invention, in another aspect, is directed to a method for determining the position of a transmission source, such as the transmission source 100 of FIG. 1. The position is determined using, for example, a processor, such as the processor 116 of FIG. 1. FIG. 2 is a flowchart 200 depicting a method for determining the position of a transmission source. In this embodiment, the process of the flow chart 200 begins with forming 202 a vector a=[$a_1$ $a_2$ ... $a_N$] composed of the signal strength observed by each of N access points. Following the step of forming 202, the processor 116 recalls 204, 206 and 208, the access point position vectors, the distance-power gradient vector and the one-meter power vector, respectively. A first "guess" (initial condition) of the location of the transmission source 100 is then established. This initial condition may be, for example, specified by an operator or specified by a software routine running on the processor 116. The center of the space in which the receivers 110 are located may, for example, be chosen as the initial condition in the absence of any information that suggests a possible location for the transmission source 100.

Based on the initial condition, the processor 116 then calculates the first-order partial derivatives 214 using equations (17a and 17b) and the second-order partial derivatives 212 using equations (19a, 19b and 19c). The processor 116 then substitutes the results of the calculations 214 and 212 into equation (18) to generate a new estimate of the transmission source 100 location. The processor then compares 218 the initial condition 210 with the new estimate generated 216. If the value of the initial condition and the new estimate are within 0.1 meters the processor 116 terminates 220 the method of determining the location of the transmission source as depicted in flowchart 200. If, however, the new estimate generated 216 is not within a pre-established error (e.g., about 0.1 meters) of the initial condition 210 the processor 116 iterates the calculations performed by using the new estimate generated 216 as an initial condition to subsequently generate a "newer" estimate (by re-calculating the first-order partial derivatives 214 and the second-order partial derivatives 212 based upon the new estimate generated 216) of the transmission source 100 location. This iterative process is continued until the prior estimate is within about 0.1 meters of the newer estimate. An operator as required for a specific application of the invention may, for example, establish the pre-established error. In some circumstances, for example, an accuracy of at least about 0.01, 0.5, 1, 5, 10, 50 or about 100 meters may be desirable.

Multiple-State Position Fixing

Figure 3:
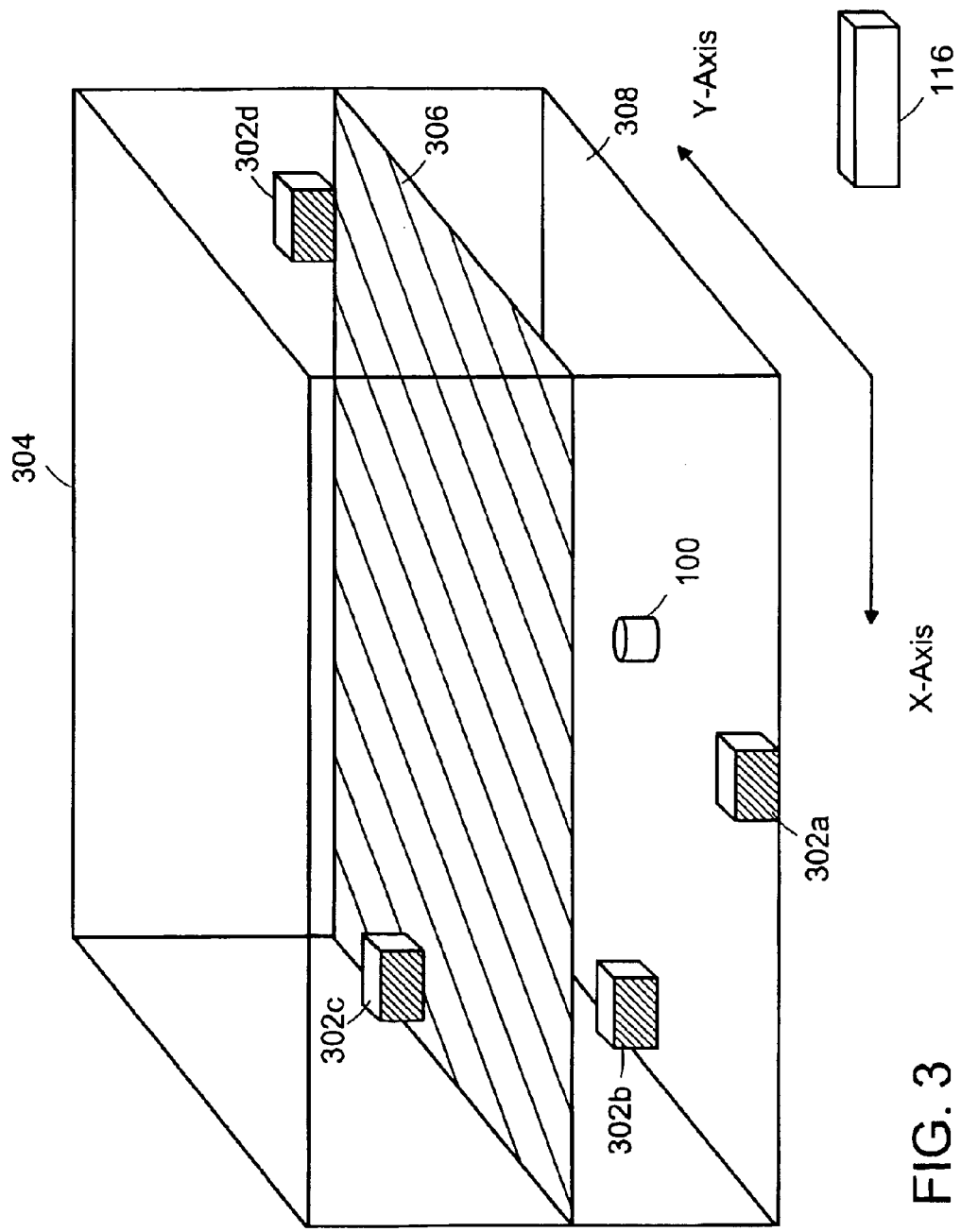
FIG. 3 is a schematic of a system for determining the location of a transmission source in a multi-floor structure according to an illustrative embodiment of the invention.

FIG. 3 illustrates another embodiment of the invention that involves a method for determining the location of a transmission source 100 within a multi-floor structure 304. In one embodiment, an upper floor 306 of the structure 304 is constructed from an open grating material, and as a result is neither radio nor optically opaque. The structure 304 has a lower floor 308. The structure 304 has four receivers 302*a*, 302*b*, 302*c* and 302*d* (generally 302), which are deployed within the space of the structure 304 to provide roughly uniform coverage (receiver coverage) over the upper 306 and lower 308 floors. The receivers 302 receive at least one signal transmitted by the transmission source 100. The receivers 302 transmit the transmission source signal (along with the magnitude of the signal as determined by each receiver 302) to the processor 116 via a wireless communication system (not shown).

Distribution of the receivers may, generally, be selected to maximize the accuracy of the system in certain areas of the structure 304. Determining the distribution of the receivers may be accomplished by an optimization procedure (for example, using a mathematical estimator, such as a Kalman filter).

Similar to the method for locating a transmission source discussed earlier herein, the processor 116 processes the information/signals to determine the location of the transmission source 110. The position of each receiver 302 is specified using the vectors $x=[x_1 \, x_2 \ldots x_N]$ and $y=[y_1 \, y_2 \ldots y_N]$, where each value in vector x and vector y corresponds to the projection on to the X-axis and Y-axis, respectively, of the location of each receiver 302 in an X-Y Cartesian coordinate system. In this embodiment of the invention, state-specific propagation vectors are used to account for the fact that there are multiple floors (306 and 308) in the structure 304. If the transmission source 100 is located on the lower floor 308 (state 1), the propagation coefficients are specified as the following vectors:

$$g_1=[g_{11} g_{21} \ldots g_{N1}] \text{ and } P_1=[P_{11} P_{21} \ldots P_{N1}], \quad (20)$$

where $g_1$ is a vector of distance-power gradient values corresponding to each receiver for state 1 and $P_1$ is a vector of signal power values received at 1 meter corresponding to each receiver for state 1. When the transmission source is located on the upper floor 306 (state 2), the propagation coefficients are specified as:

$$g_2=[g_{12} \, g_{22} \ldots g_{N2}] \text{ and } P_2=[P_{12} \, P_{22} \ldots P_{N2}], \quad (21)$$

where $g_2$ is a vector of distance-power gradient values corresponding to each receiver for state 1 and $P_2$ is a vector of signal power values received at 1 meter corresponding to each receiver for state 2.

Assuming signal strength vector, a (for example, signal strength vector a of equation (13)), the following steps are performed to determine the location (i.e., floor and X-Y position) of the transmission source 100 in the structure 304. Using a, the state 1 coefficients of equation (20), and the method steps of equations 13–19c, an estimate of the position $\{x_1,y_1\}$ of the transmission source 100 on the lower level 308 is calculated. Using a, the state 2 coefficients of equation (22), and the method steps of equations 13–19c, an estimate of the position $\{x_2,y_2\}$ of the transmission source 100 on the upper level 306 is calculated. The values $\{x_1,y_1\}$ and the state 1 coefficients are substituted into the likelihood function, equation (2), yielding a result $L_1$. The values $\{x_2,y_2\}$ and the state 2 coefficients are substituted into the likelihood function, Equation (2), yielding a result $L_2$. The processor 116 then compares the values of $L_1$ and $L_2$. If $L_1 > L_2$ the transmission source 100 is located on the lower level 308 at position $\{x_1,y_1\}$. If, however, $L_1 < L_2$ the transmission source 100 is located on the upper level 306 at position $\{x_2,y_2\}$. In this embodiment of the invention, as illustrated in FIG. 3, the processor 116 indicates that the transmission source 100 is located on the lower level 308 at position $\{x_1,y_1\}$.

Figure 4:
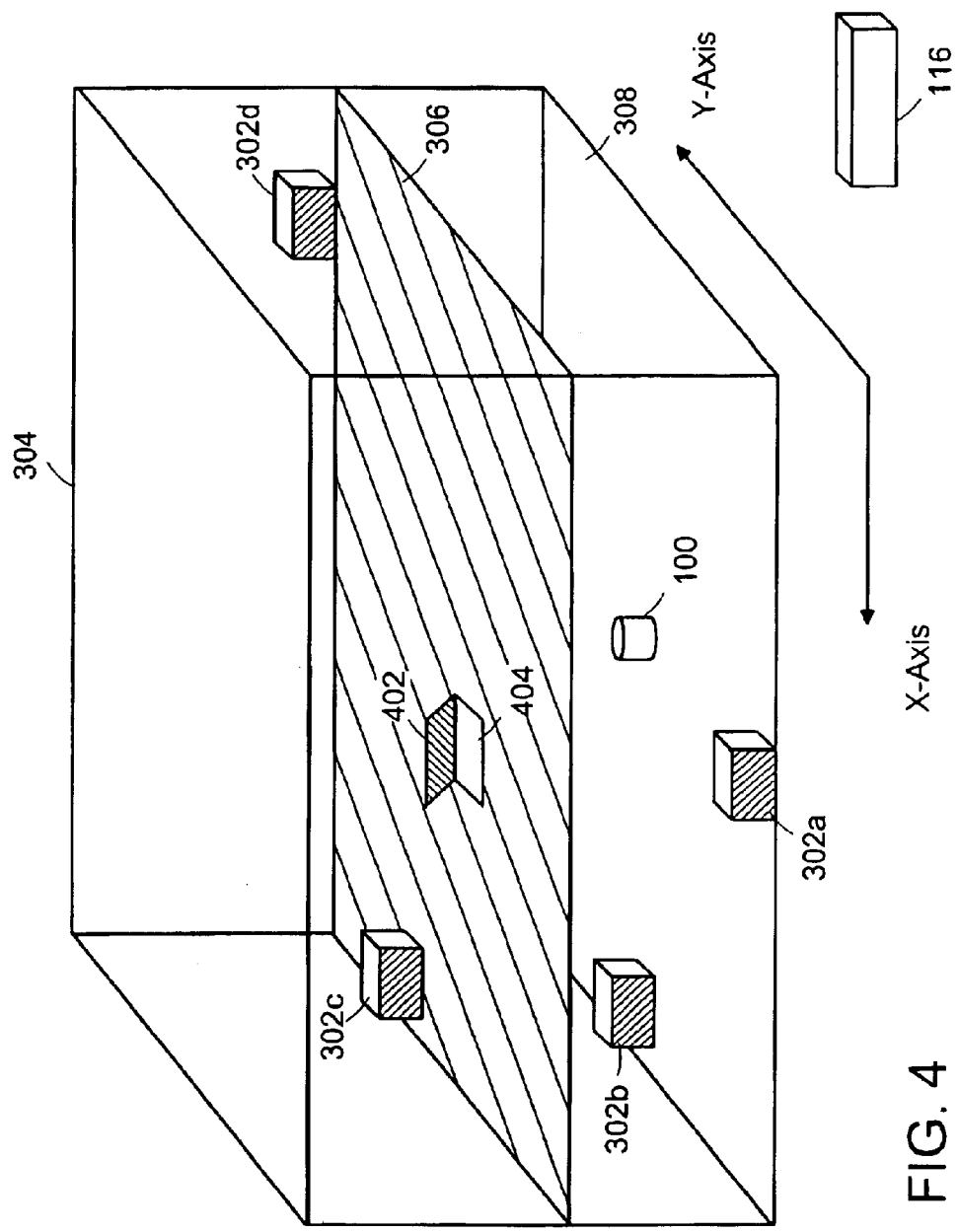
FIG. 4 is a schematic of a system for determining the location of a transmission source in a multi-floor structure with an opening between floors that may be open or closed according to an illustrative embodiment of the invention.

FIG. 4 illustrates another embodiment of the invention that involves a method for determining the location of a transmission source 100 within a multi-floor structure 304. In this illustrative embodiment, the upper floor 306 of the structure 304 has an opening 404 that may be closed by a hatch 402 to prevent movement between the upper floor 306 and the lower floor 308. This embodiment of the invention is characterized by four mutually-exclusive states: transmission source 100 on lower floor 308, hatch 402 open; transmission source 100 on lower floor 308, hatch 402 closed; transmission source 100 on upper floor 306, hatch 402 open; and transmission source 100 on upper floor 306, hatch 402 closed.

The hatch 402 is an illustrative obstruction of a structure (such as the multi-floor structure 304) that can be modeled as a state in various embodiments of the invention. The obstruction can be anything that may change the characteristics (e.g., magnitude of transmitted signal) of the received signals and which can also be modeled as a state. By way of example, possible obstructions in a structure or building also include elevators, staircases, or building support columns. In an application of the invention outdoors possible obstructions include buildings on a city block, bridges, or subway tunnels.

To determine the location (i.e., floor and X-Y position) of the transmission source 100 four sets of environment-specific propagation coefficients (e.g., vector $g_{N_i}$ and $P_{N_i}$) are used to generate four position estimates for the transmission source 100. A likelihood function is calculated based on each position estimate in a manner similar to that performed earlier herein with respect to FIG. 3. The likelihood estimate (i.e., $L_i$) with a maximum value (maximum likelihood) identifies the location (i.e., floor and X-Y position) of the transmission source 100. The maximum likelihood also indicates along with an indication of whether the hatch 402 is open or closed.

It may seem that both the number of states searched and the number of access points (receivers) involved in performing each location estimation increases as the dimensions of, for example, the structure 304 increase or the number of rooms increases. This is not, generally, the situation because the distance-dependent attenuation of the transmission signal guarantees the transmission source 100 must be on a floor (or in a room) adjoining that floor on which the maximum signal strength is received. As a result, only a small subset of states needs to be searched for each position estimate.

In an aspect of the invention, a processor, such as the processor 116 of FIG. 3, may provide an operator or a person in possession of the transmission source 110 with directions specifying a route of travel that the person should traverse. By way of example, this would be of use in identifying the shortest route of travel between the transmission source 110 and an alternate location in, for example, a sailing vessel. Alternatively, if the method of the invention is adapted to specify as independent states the condition of a smoke detector (e.g., indicating whether a room or receiver location is exposed to smoke), the processor 116 could provide an operator with position or route information useful for aiding personnel in avoiding the smoke.

Calibration

In this aspect of the invention, the propagation coefficients are estimated for each required state. At the time of system deployment a unique coordinate system and origin are selected within which to operate the system. By way of example, the coordinate system may be a two-dimensional Cartesian (X-Y axes) coordinate system. The coordinate system, alternatively, may be a polar coordinate system or any other suitable system in which the location of a transmission source, receivers, doors, or fixtures may be specified and previously used herein. The location of all access points is measured and recorded in, for example, a database stored on a processor, such as the processor 116 of FIG. 1. In one aspect of the invention, the location of the access points in the coordinate system are specified to within about 10 cm (which may represent the approximate accuracy that is desired for determining the location of the transmission source).

Next, the processor is switched to a calibration mode, which permits for entry and inspection of information collected, stored, and/or retrieved during a calibration session. The calibration procedure begins as a transmission source, such as the transmission source 100 of FIG. 1, is moved to a variety of known locations (the position of which is accurately known beforehand, for example, by a survey operation). At each location the transmission source emits at least one signal (e.g., calibration packet), and the location of the transmission source is entered into the processor. The signal strength vector for the signal transmitted by the transmission source measured at each known location, coordinates of each location, and, for example, the floor on which the source is located are stored in the processor for use in a subsequent calibration step or during operation.

An illustrative calibration step includes collecting l signal strength vectors, which are each of the form:

$$a_l = [a_{1l}\ a_{2l}\ \ldots\ a_{Nl}]. \quad (22)$$

In a typical calibration exercise, l ranges from four to twelve. At each location where calibration data is acquired, the accompanying transmission source position is given as $\{x_{cl}, y_{cl}\}$, where the inclusion of the identifier, c, is used to distinguish the calibration locations from the access point locations. The entire set of observations acquired through the process of calibration may be represented by the log-likelihood function:

$$\ln(p_{A/g,P}(A/g, P)) = \quad (23)$$

$$\sum_{l=1}^{L}\sum_{n=1}^{N} \ln\left(\frac{a_{nl}\pi}{2P_n}[(x_{cl}-x_n)^2+(y_{cl}-y_n)^2]^{\frac{g_n}{2}}\right) -$$

$$\sum_{l=1}^{L}\sum_{n=1}^{N} \left(\frac{a_{nl}^2\pi}{4P_n}[(x_{cl}-x_n)^2+(y_{cl}-y_n)^2]^{\frac{g_n}{2}}\right)$$

The best estimates of the n-th propagation parameters are those which satisfy the relationship by using the Newton-Raphson algorithm describe earlier herein:

$$\begin{bmatrix}\frac{\partial \ln(p_{A/g,P}(A/g,P))}{\partial \hat{g}} \\ \frac{\partial \ln(p_{A/x,P}(A/g,P))}{\partial \hat{P}_n}\end{bmatrix} = \begin{bmatrix}0\\0\end{bmatrix}, \quad (24)$$

where:

$$\frac{\partial \ln(p_{A/g,P}(A/g,P))}{\partial g_n} = \frac{1}{2}\sum_{l=1}^{L}\ln([(x_{cl}-x_n)^2+(y_{cl}-y_n)^2]) - \quad (25)$$

$$\frac{\pi}{8P_n}\sum_{l=1}^{L} a_{nl}^2[(x_{cl}-x_n)^2+(y_{cl}-y_n)^2]^{\frac{g_n}{2}}\ln[(x_{cl}-x_n)^2+(y_{cl}-y_n)^2],$$

$$\frac{\partial \ln(p_{A/g,P}(A/g,P))}{\partial P_n} = \frac{\pi}{4P_n^2}\sum_{l=1}^{L} a_{nl}^2[(x_{cl}-x_n)^2+(y_{cl}-y_n)^2]^{\frac{g_n}{2}} - \frac{L}{P_n}. \quad (26)$$

Variations, modifications, and other implementations of what is may be employed without departing from the spirit and the scope of the invention. Accordingly, the invention is not to be defined only by the preceding illustrative description, but instead by the appended claims and equivalents thereof.

What is claimed is:

1. A method for determining the location of a transmission source, the method comprising the steps of:

receiving at a plurality of signal receiving locations at least one signal from a transmission source;

determining a signal magnitude of each of the at least one transmission signal received at the plurality of signal receiving locations; and processing each of the signal magnitudes with a statistical model of the signal propagation characteristics associated with the signal space between the transmission source and each of the receiving locations to determine the location of the transmission source; wherein the location is at least in part determined by at least one signal magnitude, and by a distance power gradient of the transmission source relative to at least one of the plurality of signal receiving locations.

2. The method of claim 1 wherein the step of processing comprises:

processing information associated with a physical environment between the transmission source and each of the receiving locations.

3. The method of claim 2 wherein the step of processing comprises:

determining a route of travel between the transmission source and at least one of the receiving locations.

4. The method of claim 2 wherein the step of processing comprises:

determining a route of travel between the transmission source and an alternate location.

5. The method of claim 2 wherein the information associated with a physical environment includes state information associated with elements of a route of travel between the transmission source and an alternate location.

6. The method of claim 5 wherein the state information includes whether a door is open or closed.

7. The method of claim 1 wherein the transmission source is mobile.

8. The method of claim 1 wherein the transmission source signal comprises a signal representative of a characteristic of the transmission source.

9. The method of claim 1 wherein the transmission source signal comprises a signal representative of a characteristic of a person in contact with the transmission source.

10. The method of claim 1 wherein the statistical model of the signal propagation characteristics comprises data representative of the manner in which the at least one signal from the transmission source changes with respect to the distance of the at least one signal from the transmission source.

11. The method of claim 1 wherein the step of processing comprises performing an optimization procedure to determine the location of the transmission source.

12. The method of claim 11 wherein the optimization procedure comprises averaging at least two position estimates.

13. The method of claim 11 wherein the optimization procedure comprises a Kalman filter.

14. A system for determining the location of a transmission source comprising:
a transmission source capable of transmitting at least one signal;
a plurality of receivers each capable of receiving the at least one transmitted signal;
a processor capable of determining signal magnitudes of the at least one transmitted signal as received by each of the plurality of receivers and capable of processing each of the signal magnitudes with a statistical model of the signal propagation characteristics associated with the signal space between the transmission source and each of the receiving locations to determine the location of the transmission source; wherein the location is at least in part determined by at least one signal magnitude, and by a distance power gradient of the transmission source relative to at least one of the plurality of receivers.

15. The system of claim 14 wherein the processor is capable of processing information associated with a physical environment between the transmission source and each of the receiver locations.

16. The system of claim 15 wherein the processor determines a route of travel between the transmission source and at least one of the receivers.

17. The system of claim 15 wherein the processor determines a route of travel between the transmission source and an alternate location.

18. The system of claim 15 wherein the information associated with a physical environment includes state information associated with elements of a route of travel between the transmission source and an alternate location.

19. The system of claim 18 wherein the state information includes whether a door is open or closed.

20. The system of claim 14 wherein the transmission source is mobile.

21. The system of claim 14 wherein the transmission signal comprises a signal representative of a characteristic of the transmission source.

22. The system of claim 14 wherein the transmission signal comprises a signal representative of a characteristic of a person in contact with the transmission source.

23. The system of claim 14 wherein the statistical model of the signal propagation characteristics comprises data representative of the manner in which the at least one signal from the transmission source changes with respect to the distance of the at least one signal from the transmission source.

24. The system of claim 14 wherein the processor is capable of performing an optimization procedure to determine the location of the transmission source.

25. The system of claim 24 wherein the optimization procedure includes averaging at least two position estimates.

26. The system of claim 24 wherein the optimization procedure includes a Kalman filter.

27. A system for determining the location of a transmission source, comprising a log likelihood function of the general form:

$$\ln(p_{a/x,y}(a/x, y)) = \sum_{n=1}^{N} \ln\left(\frac{a_n \pi}{2P_n}[(x-x_n)^2 + (y-y_n)^2]^{\frac{g_n}{2}}\right) - \sum_{n=1}^{N} \left(\frac{a_n^2 \pi}{4P_n}[(x-x_n)^2 + (y-y_n)^2]^{\frac{g_n}{2}}\right);$$

wherein x is a location along an X-axis of a Cartesian coordinate system;

y is a location along a Y-axis of a Cartesian coordinate system that is orthogonal to the X-axis;

$x_n$ represents an X-axis location of an $n^{th}$ receiver in the Cartesian coordinate system;

$y_n$ represents an Y-axis location of an $n^{th}$ receiver in the Cartesian coordinate system;

$a_n$ is a measured signal strength at the location of the $n^{th}$ receiver;

$g_n$ is a distance power gradient of the $n^{th}$ receiver relative to the transmitter;

$P_n$ is a power received by the $n^{th}$ receiver at a location one meter from a transmitter; and $p_{a/x,y}$ is a likelihood function.

28. A method for determining the location of a receiver, the method comprising the steps of:
receiving at a receiver a plurality of signals from a plurality of transmission sources;
determining a signal magnitude of each of the plurality of signals received at the receiver; and
processing each of the signal magnitudes with a statistical model of the signal propagation characteristics associated with the signal space between the receiver and each of the plurality of transmission sources to determine the location of the receiver, wherein the location is at least in part determined by at least one signal magnitude, and by a distance power gradient of the receiver relative to at least one of the plurality of transmission sources.

* * * * *